June 11, 1935.  H. R. SAGE  2,004,396
METHOD OF MANUFACTURING HOT CAPS
Filed May 28, 1934   2 Sheets-Sheet 1

INVENTOR
HERBERT R. SAGE
BY
ATTORNEY

June 11, 1935.  H. R. SAGE  2,004,396

METHOD OF MANUFACTURING HOT CAPS

Filed May 28, 1934   2 Sheets-Sheet 2

INVENTOR
HERBERT R. SAGE
BY
ATTORNEY

Patented June 11, 1935

2,004,396

UNITED STATES PATENT OFFICE 2,004,396

METHOD OF MANUFACTURING HOT CAPS

Herbert R. Sage, Los Angeles, Calif.

Application May 28, 1934, Serial No. 727,847

3 Claims. (Cl. 93—1)

This invention relates to a novel method of manufacturing a reinforced cap formed of light paper and provided with reinforcing strips which it is desired to lie in planes obliquely disposed relative to the axis of the cap.

In my application Serial No. 534,855, filed May 4, 1931, and which has since issued into U. S. Letters Patent No. 1,861,981, dated June 7, 1932, I have shown and described a hot cap which is suitable to be manufactured by the method of my invention. The present case covers a novel method disclosed in the aforesaid application.

The object of this invention is to provide a novel method of producing hot caps by which these may be economically manufactured.

The manner of accomplishing the foregoing object as well as further objects and advantages will be made manifest in the following description taken in connection with the accompanying drawings, in which:

Figs. 1 and 2 are drawn to the same scale; and Figs. 3 and 4 are drawn to a somewhat larger scale. Similar reference numerals refer to similar parts throughout the several views.

In manufacturing my hot caps I first take a long strip of suitable material, such as properly prepared water-proofed paper in roll form, and attach a series of longitudinal spaced reinforcing strips to one side thereof, as by means of paraffine, wax or other waterproof adhesive. This may be accomplished by a continuous process in ways that are well understood. A sheet of such material is shown at 5, and the reinforcing strips are shown at 6.

The cap blanks, in the form of circular sectors or annular sectors, are cut from the thus prepared sheet. The form of my invention that has been selected for illustration is a hollow truncated cone, and the blanks from which such caps are made are annular sectors cut from the prepared sheet along the dotted lines 7, 8, and 9. I prefer to cut the blanks from the prepared sheet in such a manner that the reinforcing strips will be perpendicular to the axes of symmetry of the blanks, as illustrated.

Figure 1:
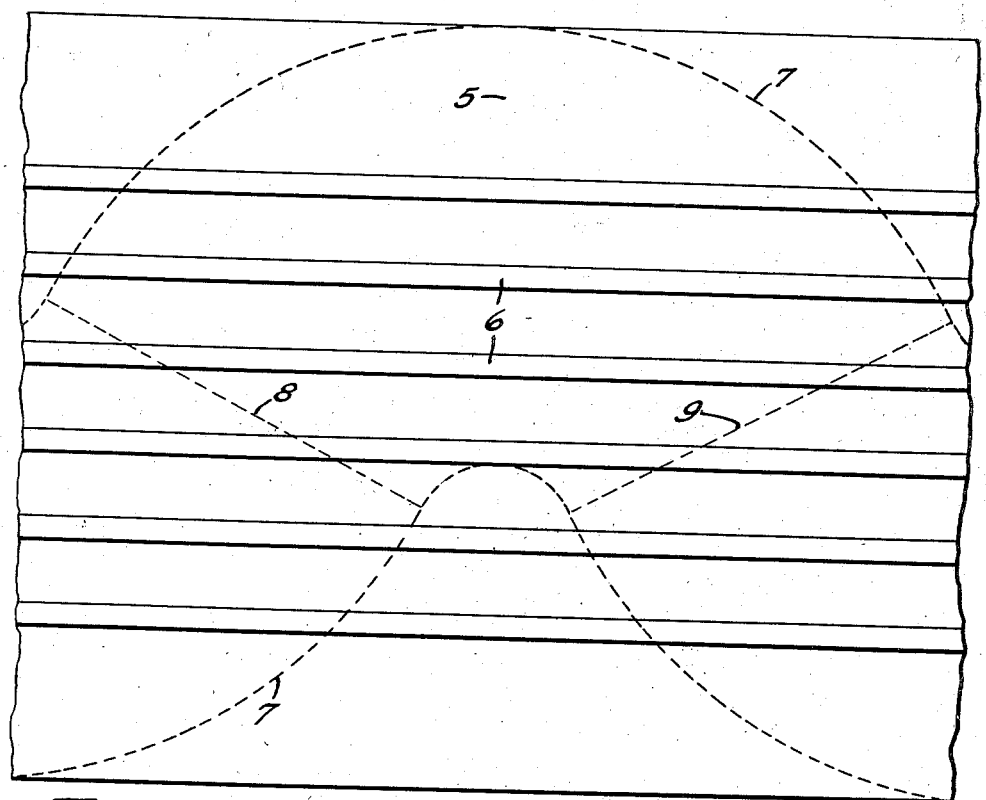
Fig. 1 is a fragmentary plan view of a sheet of prepared material from which the blanks for forming the caps are to be cut, showing a preferred arrangement of such blanks with respect to the material.
Figure 2:
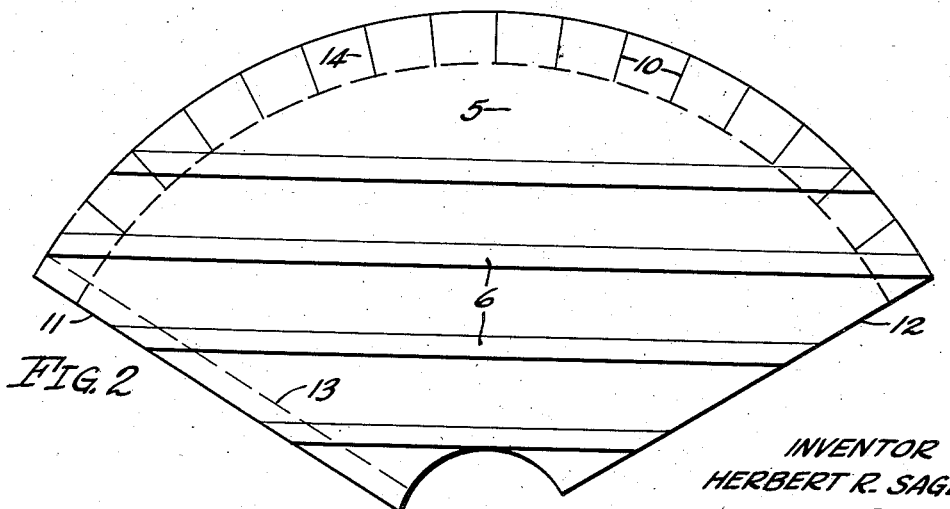
Fig. 2 is a plan view of a cap blank after being cut from the material, and after being otherwise prepared for being formed into a completed cap.

After being severed from the prepared sheet, radial kerfs 10 are cut inwardly a uniform distance from the larger circular portion of the perimeter of the blanks, and they will then appear as shown in Fig. 2.

The blanks are next formed into a conical cap over a mandrel, with the reinforcing strips on the inside, and with edges 11 and 12 overlapped by the amount indicated by broken line 13. These overlapped portions are then joined together by means of a water-proof adhesive.

Figure 3:
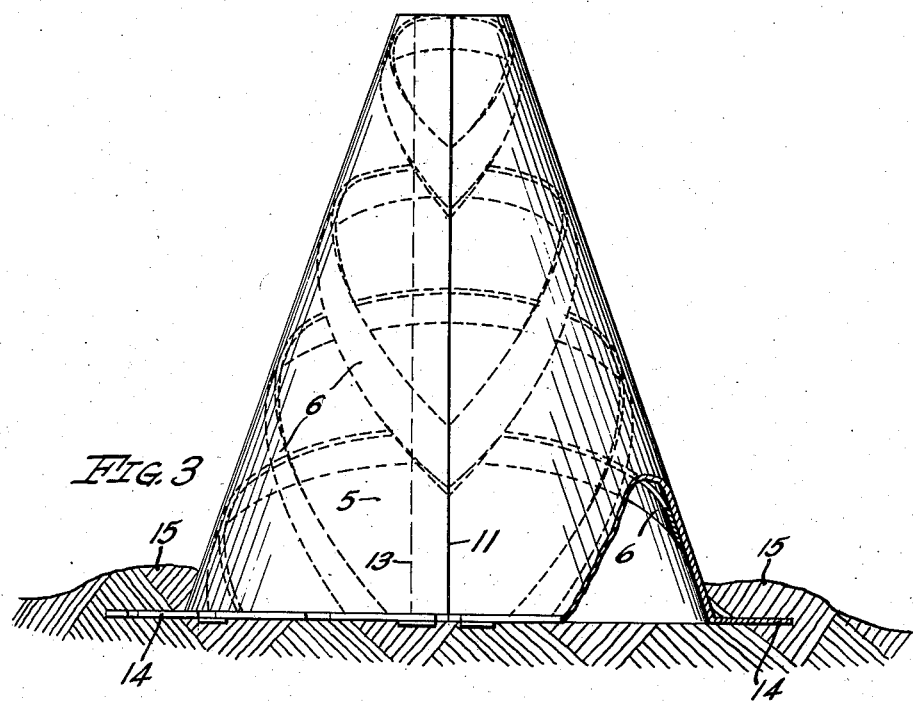
Fig. 3 is a partly broken elevation of a completed cap, showing the manner in which it may be anchored in place in the earth; and, Fig. 4 is a plan view of a completed cap.
Figure 4:
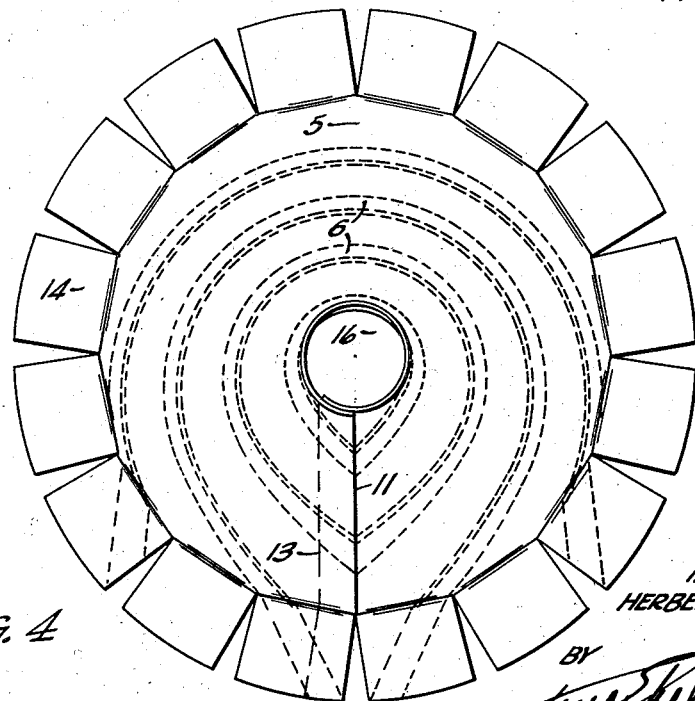

Finally the flaps 14 are bent outwardly to form what amounts to a kerfed circular flange at the base of the conical cap as shown in Fig. 4. These flaps may have earth placed over them, in the manner illustrated at 15 in Fig. 3, and thus are adapted to serve as means for anchoring the caps in place.

The shaping of the cap blanks into cones will cause reinforcing strips 6 to assume the form of loops, in planes that intersect the axis of the cone obliquely. These reinforcing loops are either closed on themselves or terminate at the supported base of the cone, and are thus adapted to act as structural arches for resisting lateral pressure against the cap. The fact that the planes of these loops are oblique to the axis of the cone, enables the reinforcing strips to act structurally as diagonal braces also, to resist vertical forces which might otherwise cause the cap to collapse, such as the weight of accumulated water or frost upon the outer surface.

I prefer to use for the material of the caps, a suitable kind of waterproofed paper, such as paraffined paper, of a quality and color which is adapted to act as a selective filter of solar radiation to exclude such rays as may be considered harmful to young plant life. In this manner both the opacity and color of the material may be selected to produce the maximum beneficial effect. The material may be impregnated or otherwise treated with substances such as creosote or arsenical compounds, to repel the invasion of destructive insects, and thus add to the usefulness of the device.

I also prefer to make my cap in the form of a truncated cone, as illustrated, for several reasons. This form provides a small circular opening 16 at the top of the cap, which is necessary for ventilating purposes. The growing plant will, in time, extend through this opening; and further growth of the plant, after it has reached this stage and no longer requires the protection of the cap, will finally result in tearing the relatively weak material of which the cap is formed. Thus the caps eventually will be automatically removed by the growth of the plant which was protected thereby in its early life. In this truncated form of cap, therefore, there will be no necessity for hand removal.

It will be obvious that the arrangement of the cap blanks with reference to the prepared material from which they are cut, may be considerably varied, and it also will be plain that various departures may be made in the arrangement, spacing, and dimensions, of reinforcing strips 6. Such departures will result in a more or less different arrangement of the reinforcement of the completed cap; but, in any event, the reinforcing strips will tend to take the form of structural arches, disposed in planes which are oblique to the axis of the cap.

The drawings, for purposes of clarity, show the material of the cap, and of the reinforcing strips, as being of considerable thickness. In practice these are much thinner in proportion than the illustrations indicate. Nevertheless the reinforcing strips will add very materially to the mechanical strength of the cap to resist collapse by reason of superposed moisture or frost, and to resist the lateral force of wind pressure.

It is thus seen that I have produced a novel method of manufacturing hot caps in which the reinforcing strips may be applied to the matrix sheet 5 continuously and the cap blanks cut from this sheet in such a manner as to cause a minimum of waste and produce identical blanks facing in opposite directions across the sheet.

What I claim is:

1. The method of making an article of the character described, which consists in: preparing a strip of sheet material from which the article is to be constructed; attaching a plurality of parallel spaced longitudinal reinforcing strips to a surface of said sheet material; cutting blanks from said prepared material through said reinforcing strips; and forming said blanks into hollow truncated cones with the reinforcing strips on the inside, and having overlapping longitudinal joints.

2. The method of making an article of the character described, which consists in: preparing a matrix sheet from which the article is to be constructed; attaching a plurality of spaced longitudinally disposed reinforcing strips to a surface of said matrix sheet; cutting sector shaped blanks from said prepared material through said reinforcing strips in such a manner that adjacent blanks are oppositely disposed relative to each other on said sheet; and forming said blanks into hollow cone shapes by uniting the radial edges of said blanks.

3. The method of making an article of the character described, which consists in: preparing a matrix sheet from which the article is to be constructed; attaching a plurality of spaced longitudinally disposed reinforcing strips to a surface of said matrix sheet; cutting sector shaped blanks from said prepared material through said reinforcing strips in such a manner that adjacent blanks are oppositely disposed relative to each other on said sheet and so that said strips are perpendicular to the axes of symmetry of said blanks; and forming said blanks into hollow cone shapes by uniting the radial edges of said blanks.

HERBERT R. SAGE.